United States Patent Office 3,847,829
Patented Nov. 12, 1974

3,847,829
CRYSTALLINE BISMUTH-CONTAINING OXIDES
Robert J. Bouchard, Wilmington, Del., assignor to E. I. du Pont de Nemours and Company, Wilmington, Del.
No Drawing. Filed Aug. 10, 1973, Ser. No. 387,479
Int. Cl. H01b 3/02
U.S. Cl. 252—63.5    10 Claims

ABSTRACT OF THE DISCLOSURE

Crystalline bismuth-containing oxides of the formula $$Bi_{2-x}M_xM'_{2-y}M''_yO_{7-z}$$

wherein:

M is a rare earth metal of atomic number 57–71, lead, cadmium or yttrium,
M' is iron, gallium, or indium,
M'' is antimony, tantalum, or niobium,
x is a number in the range 0 to 1,
y is a number in the range 1 to 1.5, and
z is a number in the range 0 to 0.5 have enhanced dielectric properties for use in capacitor applications.

BACKGROUND OF THE INVENTION

(1) Field of the Invention

This invention relates to a group of new crystalline bismuth-containing oxides having unexpected and unusual dielectric properties and their use in capacitor applications.

(2) Description of the Prior Art

The mineral known as pyrochlore has a variable composition generally expressed as $(Na,Ca)_2(Nb,Ti)_2(O,F)_7$, but which normally approaches the simpler formulation, $NaCaNb_2O_6F$. The cubic unit cell of pyrochlore has dimensions of about 10.4 A. and contains 8 formula units of approximate composition $A_2B_2X_7$, where A and B are cations in which the radius of A (i.e., Na+ or Ca2+) is greater than that of B (i.e., Nb5+ or Ti4+) and where X is an anion (i.e., O2− or F−).

Numerous compositions, both natural and synthetic, crystallize with structures similar to that of pyrochlore. These are normally described as having crystalline structure of the "pyrochlore-type." While pyrochlore-type compositions are generally of the formula $A_2B_2X_7$, the seventh anion is not essential to the stability of the structure, and pyrochlore-type phases with compositions $A_2B_2O_{7-z}$ where $0 \leq z \leq 1$, frequently occur, e.g., $Ag_2Sb_2O_6$. Vacancies can also occur in the normally occupied cation positions particularly those of the large A cations. Crystalline compositions of pyrochlore type can be obtained by combining ions of different valencies in a number of ways, e.g., $A_2^{2+}B_2^{5+}O_7$, $A_2^{3+}B_2^{4+}O_7$, $A^{2+}A^{3+}B^{4+}B^{5+}O_7$ and $$A^{2+}A^{3+}B_2^{4+}O_{6.5}.$$

Multicomponent pyrochlore-type phases, such as $$A^{2+}A^{3+}B^{4+}B^{5+}O_7$$

are normally regarded as "solid solutions" between parent ternary compositions, e.g., $A_2^{2+}B_2^{5+}O_7$ and $A_2^{3+}B_2^{4+}O_7$. The mineral $(Na,Ca)_2(Nb,Ti)_2(O,F)_7$ is itself a complex example of such a solid solution. Though uncommon, a composition with pyrochloro-type structure may be slightly distorted from cubic symmetry.

U.S. Pat. 3,533,109 to Hoffman discloses resistor compositions which yield, upon firing, smooth resistors having a wide range of resistances, low temperature coefficient of resistances and good stability properties. A component of these compositions are the oxides of the formula $$(M_xBi_{2-x})(M'_yRu_{2-y})O_{7-z},$$

wherein

M is yttrium, lanthanum, thallium, indium, cadmium, lead or a rare earth metal of atomic number 58–71,
M' is platinum, titanium, tin, chromium, rhodium, iridium, rhenium, zirconium, antimony or germanium,
x is a number in the range 0–2,
y is a number in the range 0–2, and
z is a number in the range 0–1, being at least equal to about x/2 when M is a divalent metal.

U.S. Pat. 3,681,262 to Bouchard discloses binary resistor compositions of polynary oxides and dielectric material. The polynary oxides are of the formula $$(M_xBi_{2-x})(M'_yM''_{2-y})O_{7-z}$$

wherein:

M is Y, Tl, In, Cd, Pb or a rare earth metal of atomic number 57–71;
M' is Pt, Ti, Sn, Cr, Rh, Re, Zr, Sb or Ge;
M'' is Ru or Ir;
x is a number in the range 0–2;
y is a number in the range 0–2; and
z is a number in the range 0–1, being at least equal to about x/2 when M is a divalent metal.

U.S. Patent 3,583,931 to Bouchard discloses electrically conductive compositions of the pyrochlore-related crystal structure of the formula $(M_xBi_{2-x})(M'_yM''_{2-y})O_{7-z}$ wherein:

M is yttrium, thallium, indium, cadmium, lead or a rare earth metal of atomic number 57–71,
M' is platinum, titanium, chromium, rhodium or antimony;
M'' is ruthenium or iridium;
x is a number in the range 0–1;
y is a number in the range 0 to about 0.5, with the proviso that y is a number in the range 0–1 when M' is rhodium or more than one of platinum, titanium, chromium, rhodium and antimony; and
z is a number in the range 0–1, being at least equal to about x/2 when M is divalent lead or cadmium.

In Kristallografiya, 10(2), 246 (1965), Kupriyanov et al., in an article entitled "New Pb and Bi Containing Pyrochlores," discuss anion deficient pyrochlores of the type $Bi_2M^{+2}M^{+4}O_6$ wherein $M^{+2}$ is cadmium and $M^{+4}$ is tin or zirconium.

SUMMARY OF THE INVENTION

In accordance with the present invention crystalline bismuth-containing oxides having enhanced dielectric properties have been discovered which are of the formula $Bi_{2-x}M_xM'_{2-y}M''_yO_{7-z}$ wherein:

M is a rare earth metal of atomic number 57–71, lead, cadmium or yttrium,
M' is iron, gallium, or indium,
M'' is antimony, tantalum, or niobium,
x is a number in the range 0–1,
y is a number in the range 1–1.5, and
z is a number in the range 0–0.5.

The crystalline bismuth-containing oxides of this invention are distinguished from pyrochlore-type oxides of the prior art in that M' is at least 0.5, Bi is at least 1 and O is at least 6.5

DETAILED DESCRIPTION OF THE INVENTION

This bismuth-containing oxides of this invention possess crystal structures that are closely related to that of the mineral known as pyrochlore. In the most preferred configuration, the bismuth-containing oxides are of the formula $$Bi_2M'M''O_7$$

wherein M' is iron or indium, and M" is antimony or niobium.

The oxides of the present invention may be prepared by grinding reagent grade oxides in an automatic mortar grinder using an agate mortar and pestle. Reaction of the mixture of the requisite ground oxides is then affected by heating the mixture either under vacuum, or in oxygen or air, to a temperature in the range of about 800–1300° C. Optionally, an excess of $Bi_2O_3$ over that required for stoichiometry can be used to promote faster reaction and to facilitate the preparation of pure products. The excess $Bi_2O_3$ can be leached out of the crude product with a suitable solvent such as nitric acid.

Prior to heating, the mixture of oxides may be in compacted (pelletized) or uncompacted form, as desired.

Generally capacitor dielectrics fall into two categories: the first has a relatively temperature-independent dielectric constant, but the value of the dielectric constant is very low (5–10). Such materials as electrical porcelain and mica fall into this class. The second category includes materials like $BiTiO_3$, which have very high dielectric constants (>1000), which is desirable, but they are extremely temperature dependent, which makes them useless as circuit elements in tuning or resonance circuits, since small normally unavoidable changes in ambient temperature throw the circuit out of resonance.

The compositions of the present invention are useful over a wide range of frequencies. Table 2 illustrates the invariance of the dielectric constant with varying frequencies of the compounds listed in Table 1. In Table 2 all dielectric measurements were made on sintered disks of the compounds using silver point electrodes and an automatic capacitance bridge with digital circuitry at 25° C.

TABLE 2.—FREQUENCY INVARIANCE

| Sample | Compound formula | $10^3$ | | $10^4$ | | $10^5$ | | $10^6$ | |
|---|---|---|---|---|---|---|---|---|---|
| | | K' | DF | K' | DF | K' | DF | K' | DF |
| F | $Bi_2FeSbO_7$ | 39.7 | <.0001 | 39.8 | .0007 | 39.7 | .0005 | 39.8 | .003 |
| G | $Bi_2InSbO_7$ | 28.1 | .008 | 27.9 | .008 | 27.5 | .004 | 27.5 | .006 |
| H | $BiPbFe_{0.5}Sb_{1.5}O_7$ | 15.5 | .004 | 15.5 | .002 | 15.5 | .001 | 15.5 | .002 |
| I | $BiPbFeSbO_{6.5}$ | 49 | .006 | 49 | .006 | 48.5 | .004 | 48.5 | .005 |
| J | $Bi_2FeNbO_7$ | 144 | .005 | 144 | .002 | 144 | .001 | 144 | <.001 |

It is preferred to effect the reaction in platinum crucibles open to the air, or under oxygen, or in sealed platinum tubes under vacuum. Vessels of other high-melting inert materials such as mullite ($3Al_2O_3 \cdot 2SiO_2$), Vycor®, alumina, gold, and the like, may also be used.

Many of the compounds of the present invention can be grown in the form of single crystals. The size of the single crystals obtained can be increased easily using techniques known in the art, i.e., increasing the flux/oxide ratio, increasing the sample size and crucible size, cooling at a slower rate, and so forth.

The compositions of the present invention are useful for dielectric applications because they have a reasonably high dielectric constant, for example above about 15, which is relatively independent of temperature. Table 1 illustrates the temperature dependence of the dielectric constant of a wide range of compounds typifying the present invention. Samples A, B and C have dielectric constants which are essentially independent of temperature. Sample D has a positive temperature dependence, while Sample E has a negative temperature dependence. Compounds having a negative temperature dependence are useful for certain consumer electric applications. The dielectric measurements given in Table 1 were made on sintered disks of the compounds using silver point electrodes and an automatic capacitance bridge with digital circuitry.

The compositions of this invention are also useful for screen-printable dielectric applications. A requirement for this application is that the material, after printing in a pattern through a screen, sinters to a dense, adherent film under firing conditions commonly employed in the thick film industry, i.e., belt furnaces with top temperatures in the 1000–1050° C. range. It is somewhat unusual to find a material which has these properties, especially without the addition of any low-melting binders. For example, $BaTiO_3$ dielectric has to be fired at temperatures greater than 1200° C. to achieve sintering, so it is completely unsuitable for screen-printing applications.

Although the bismuth-containing oxides of this invention sinter very readily, it is occasionally desirable to add a small amount of glass to raise the fired density of a sintered piece or to improve adherence of a screen-printed film to a substrate where this is a particularly important requirement. Such additions fall within the scope of the invention.

Optionally, the addition of a third component to the bismuth-containing oxide and glass composition sometimes improves one of the dielectric properties. The effects of adding glass and $CaTiO_3$ to $Bi_2FeNbO_7$ are shown in Table 3. Dielectric compositions containing $CaTiO_3$ are described by R. Amin in U.S. Application Ser. No. 291,174, filed Aug. 22, 1972, now U.S. Pat. 3,787,219.

TABLE 1.—TEMPERATURE INVARIANCE

| Sample | Compound formula | Freq. (Hz.) | Dielectric constant, K' (T in ° C.) | | Loss dissipation factor, DF (T in ° C.) | |
|---|---|---|---|---|---|---|
| | | | ($T_1$) | ($T_2$) | ($T_1$) | ($T_2$) |
| A | $Bi_2FeSbO_7$ | $10^6$ | 38 (−100) | 40 (+125) | .004 (−100) | .003 (+125) |
| B | $Bi_2InSbO_7$ | $10^5$ | 28 (+25) | 29 (+400) | .008 (+25) | .01 (+400) |
| C | $BiPbFe_{0.5}Sb_{1.5}O_7$ | $10^3$ | 15.5 (−196) | 15.5 (+25) | <.001 (−196) | .004 (+25) |
| D | $BiPbFeSbO_{6.5}$ | $10_3$ | 42 (−196) | 49 (+25) | .066 (−196) | .006 (+25) |
| E | $Bi_2FeNbO_7$ | $10^6$ | 146 (0) | 134 ( 125) | <.001 (0) | .004 (+125) |

TABLE 3

| Weight percent | | | K' at 25° C. | DF* | TCC** (p.p.m./° C.) |
|---|---|---|---|---|---|
| Bi₂FeNbO₇ | Glass | CaTiO₃ | | | |
| 100 | 0 | 0 | 130 | .0104 | −620 |
| 90 | 10 | 0 | 53 | .0040 | −480 |
| 72 | 8 | 20 | 55 | <.0001 | −560 |

*K' and DF were measured on sintered pellets at a frequency of 10⁶ Hz
**TCC is temperature coefficient of capacitance calculated by the equation:

$$TCC = \frac{C\ at\ T_1 - C\ at\ T_2 \times 10^6}{C\ at\ T_1 (\Delta T)}$$

Table 3 shows that the addition of glass improves the loss factor, but also lowers the dielectric constant and temperature coefficient of capacitance. However, where the loss dissipation factor is very important for a particular application, the over-all performance may be improved. The Table also shows that the addition of glass plus CaTiO₃ (which also has a negative temperature coefficient and high dielectric constant, but is very high melting and therefore not sinterable under the usual available firing temperature of <1000° C.) can drastically lower the loss factor while retaining a high temperature coefficient, although dielectric constant is still lowered over the value obtained for $Bi_2FeNbO_7$. Therefore, it will be apparent to those skilled in the art that the addition of small amounts of various components to the compounds of this invention can modify the dielectric properties so as to "fine tune" these properties to match the requirements for a particular application. Such modifications are within the scope of this invention.

EXAMPLES OF THE INVENTION

The following examples, illustrating the novel compositions of this invention and the method of preparing them, are given without any intention that the invention be limited thereto. Unless otherwise noted, the subject oxides were all prepared by grinding the reagent grade starting materials in an automatic mortar grinder using an agate mortar and pestle. All percentages are by weight.

Example 1—$Bi_2GaNbO_7$ 0.9319 g. of $Bi_2O_3$, 0.1874 g. of $Ga_2O_3$ and 0.2658 g. of $Nb_2O_5$ were ground together for 1 hour, sealed in a Pt tube under vacuum and fired to 1300° C. for approximately 16 hours. The product was a yellow mass which gave an X-ray pattern characteristic of a pyrochlore with $a_0$ (Lattice parameter) = 10.45 A.

Example 2—$Bi_2FeNbO_7$ 1.0251 g. $Bi_2O_3$, 0.1757 g. $Fe_2O_3$, and 0.2924 g. $Nb_2O_5$ were ground together for 30 minutes, pressed into a pellet, sealed in Pt under vacuum, and fired at 1000° C. for 48 hours. The red-brown product had an X-ray pattern of the pyrochlore type, $a_0 = 10.50$ A.

Example 3—$Bi_2InSbO_7$ 0.9319 g. $Bi_2O_3$, 0.2776 g. $In_2O_3$, and 0.3235 g. $Sb_2O_5$ were ground together for one hour, pressed into a pellet, sealed in Pt under vacuum, and fired to 1000° C. for 16 hours. The yellowish-white product had an X-ray pattern of the pyrochlore type, $a_0 = 10.69$ A. with several weak extra lines.

Example 4—$Bi_2InSbO_7$ 1.1183 g. $Bi_2O_3$, 0.1666 g. $In_2O_3$, and 0.1941 g. $Sb_2O_5$ were ground toegther for one hour, pressed, sealed in Pt under vacuum, and fired to 1000° C. for 16 hours. The amount of $Bi_2O_3$ used represents a 100% excess over that required to form $Bi_2InSbO_7$. The product was ground, washed twice with nitric acid, and dried. The yellow-brown product had a single phase X-ray pattern of the pyrochlore type, $a_0 = 10.69$ A.

Example 5—$Bi_2FeTaO_7$ 0.9319 g. $Bi_2O_3$, 0.1597 g. $Fe_2O_3$, and 0.4419 g. $Ta_2O_5$ were ground for one hour, pressed into a pellet, and fired in air in a Pt crucible to 1100° C. for 24 hours. The brown product had an X-ray pattern of the pyrochlore type, $a_0 = 10.50$ A.

Example 6—$Bi_2GaSbO_7$ 4.0072 g. $Bi_2O_3$, 0.8060 g. $Ga_2O_3$, and 1.2534 g. $Sb_2O_3$ were ground together for one hour, pressed into a pellet, fired to 1000° C. in air in a Pt crucible for 72 hours. The tan product had an X-ray pattern predominantly of the pyrochlore type, $a_0 = 10.38$ A.

Example 7—$Bi_2GaTaO_7$ 0.9319 g. $Bi_2O_3$, 0.1874 g. $Ga_2O_3$, and 0.4419 g. $Ta_2O_5$ were ground together for one hour, pressed into a pellet, fired to 1200° C. in air in a Pt crucible for 16 hours. The yellowish-white product had an X-ray pattern of the pyrochlore type, $a_0 = 10.43$ A.

Example 8—$BiCdFeSbO_{6.5}$ 0.3281 g. CdO, 0.5954 g. $Bi_2O_3$, 0.2040 g. $Fe_2O_3$, and 0.3724 g. $Sb_2O_3$ were ground together for 30 minutes, and fired in air to 1000° C. in a Pt crucible for 16 hours. The brown product had an X-ray pattern of the pyrochlore type, $a_0 = 10.33$ A.

Example 9—$BiPbFe_{0.5}Sb_{1.5}O_7$ 0.4685 g. PbO, 0.4890 g. $Bi_2O_3$, 0.0837 g. $Fe_2O_3$, and 0.4588 g. $Sb_2O_3$ were ground together for 30 minutes, and fired in air to 1000° C. in a Pt crucible for 16 hours. The yellowish-brown product had an X-ray pattern of the pyrochlore type, $a_0 = 10.43$ A.

Example 10—$BiPbFeSbO_{6.5}$ 0.4910 g. PbO, 0.5126 g. $Bi_2O_3$, 0.1757 g. $Fe_2O_3$, and 0.3207 g. $Sb_2O_3$ were ground together for 30 minutes,, and fired in air to 1000° C. in a Pt crucible for 16 hours. The yellow-brown product had an X-ray pattern of the pyrochlore type, $a_0 = 10.44$ A.

Example 11—$BiGdFeSbO_7$ 0.5666 g. $Gd_2O_3$, 0.7283 g. $Bi_2O_3$, 0.2496 g. $Fe_2O_3$ and 0.4556 g. $Sb_2O_3$ were ground together for 30 minutes, and fired to 1100° C. in a Pt crucible in air for four hours. The orange-brown product had an X-ray pattern of the pyrochlore type, $a_0 = 10.37$ A.

Example 12—$BiYFeSbO_7$ 0.2963 g. $Y_2O_3$, 0.6113 g. $Bi_2O_3$, 0.2095 g. $Fe_2O_3$, and 0.3824 g. $Sb_2O_3$ were ground together for 30 minutes and fired in air for four hours at 1100° C. in a Pt crucible. The orange-brown product had an X-ray pattern of the pyrochlore type, $a_0 = 10.32$ A.

Example 13—$BiLaFeSbO_7$ 0.5438 g. $i_2O_3$, 0.3927 g. $Gd_2O_3$ and 0.5639 g. $FeSbSOB_4$ were ground together for 30 min., pressed, sealed in platinum under air, and fired to 1200° C. for 16 hrs. The hard brownish-white product had an X-ray pattern of the pyrochlore type, $a_0 = 10.50$ A.

Example 14—$BiGdFeSbO_7$ 0.5438 g. $Bi_2O_3$, 0.3927 g. $Gd_2O_3$ and 0.5639 g. $FeSbO_4$ were ground together for 30 min., pressed, sealed in platinum under air, and fired to 1200° C. for 16 hrs. The hard, brownish-white product had an X-ray pattern of the pyrochlore type, $a_0 = 10.43$ A.

Example 15—$Bi_2FeSbO_7$

This example illustrates the preparation of $Bi_2FeSbO_7$ in the form of single crystals. 0.3992 g. $Fe_2O_3$, 0.7287 g. $Sb_2O_3$, and 13.9788 g. $Bi_2O_3$ were ground together for 30 minutes, fired to 1200° C. for 16 hours in an open Pt crucible, cooled at the rate of 2.5° C./hr. to 700° C., and then removed from the furnace. $Bi_2O_3$ was used as a flux and was present in a 5-fold excess over that required to form the compound. The product was leached with nitric acid to remove the excess $Bi_2O_3$. The single crystals obtained were deep red in color and in the size range 1–2 mm. The X-ray pattern was of the pyrochlore crystal structure type ($a_0$=10.45 A.).

Example 16

The compounds listed in Table 4 were mixed with 20% by weight of an organic vehicle composed of 10% ethyl cellulose in β-terpineol. This mixture was screen-printed onto 96% alumina substrates over Pd/Ag electrodes, dried, reprinted, dried, then second electrodes were printed on. This composite was fired to various temperatures for 10 minutes, cooled and the dielectric properties measured on a GR automatic bridge. The average film thickness was about 0.002 in.

TABLE 4.—EFFECT OF FIRING TEMPERATURE

| Compound formula | Firing temperature, °C. | Dielectric constant, K' | Loss dissipation factor, DF |
|---|---|---|---|
| $Bi_2FeSbO_7$ | 950 | 32.0 | .024 |
| $Bi_2InSbO_7$ | 850 | 23.7 | .0006 |
| $Bi_2InSbO_7$ | 900 | 24.6 | .0007 |
| $Bi_2InSbO_7$ | 950 | 24.7 | .0004 |
| $Bi_2InSbO_7$ | 1,000 | 28.9 | .0007 |
| $Bi_2InSbO_7$ | 1,050 | 40.6 | <.0001 |

Four capacitor fabricates, using the screen-printed films prepared as described above, were fired at each temperature given in Table 4. The average dielectric properties obtained at $10^3$ Hz. are recorded in the Table. It can be seen from the data that while the best samples are the ones fired at the highest temperatures, useful values of dielectric constant and dissipation factor are obtained over a wide range of firing temperatures.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. The crystalline bismuth-containing oxides of the formula $$Bi_{2-x}M_xM'_{2-y}M''_yO_{7-z}$$

wherein

M is a rare earth metal of atomic number 57–71, lead, cadmium or ytrrium,

M' is iron, gallium, or indium,

M" is antimony, tantalum, or niobium, x is a number in the range 0 to 1, y is a number in the range 1 to 1.5, and z is a number in the range 0 to 0.5

2. The crystalline bismuth-containing oxides of Claim 1 in which M' is iron.

3. The crystalline bismuth-containing oxides of Claim 2 of the formula $$Bi_2FeM''O_7$$

wherein M" is antimony or niobium.

4. The crystalline bismuth-containing oxide of Claim 2 of the formula $$Bi_2FeSbO_7$$

5. The crystalline bismuth-containing oxide of Claim 2 of the formula $$Bi_2FeNbO_7$$

6. The crystalline bismuth-containing oxides of Claim 1 of the formula $$Bi_2M'M''O_7$$

wherein

M' is iron or indium and

M" is antimony or niobium.

7. The crystalline bismuth-containing oxide of Claim 6 of the formula $$Bi_2InSbO_7$$

8. A single crystal of a compound of Claim 1.

9. A single crystal of a compound of Claim 4.

10. In the method of screen printing dielectrics by printing a dielectric material in a pattern through a screen and sintering the dielectric material to a dense adherent film, the improvement which comprises using a crystalline bismuth-containing oxide of Claim 1 as the dielectric material.

References Cited

UNITED STATES PATENTS 3,553,109  1/1971  Hoffman _____ 252—514

JOHN D. WELSH, Primary Examiner

U.S. Cl. X.R.

252—519; 423—594, 617; 117—212; 317—258

UNITED STATES PATENT OFFICE
CERTIFICATE OF CORRECTION

PATENT NO. : 3,847,829
DATED : November 12, 1974
INVENTOR(S) : Robert J. Bouchard It is certified that error appears in the above-identified patent and that said Letters Patent are hereby corrected as shown below:

Column 1, line 53, "occurs" should read --occur--.

Columns 3 and 4, Table 1, the entry in the line for Sample E under the heading "Dielectric constant, K'" in the column designated as ($T_2$) should read --134 (+125)--.

Column 5, Table 3, the heading "K' at 25°C." should read --K' at 25°C.*--.

Column 5, Table 3, line 5, the first entry under the column "TCC**" should read -- -625--.

Column 5, line 10, the equation should read $$\text{--TCC} = \frac{C \text{ at } T_1 - C \text{ at } T_2}{C \text{ at } T_1 (\Delta T)} \times 10^6 \text{--}.$$

Column 6, line 57, should read --0.5482 g. $Bi_2O_3$, 0.3833 g. $La_2O_3$ and 0.5685 g. $FeSbO_4$--.

Signed and Sealed this

Twenty-first Day of December 1976

[SEAL]

Attest:

RUTH C. MASON
*Attesting Officer*

C. MARSHALL DANN
*Commissioner of Patents and Trademarks*